US008567372B2

(12) United States Patent
Visser et al.

(10) Patent No.: US 8,567,372 B2
(45) Date of Patent: Oct. 29, 2013

(54) IGNITION SYSTEM

(75) Inventors: Barend Visser, Potchefstroom (ZA); Petrus Paulus Kruger, Vredefort (ZA)

(73) Assignee: North-West University (ZA)

( * ) Notice: Subject to any disclaimer, the term of this patent is extended or adjusted under 35 U.S.C. 154(b) by 0 days.

(21) Appl. No.: 13/441,356

(22) Filed: Apr. 6, 2012

(65) Prior Publication Data

US 2012/0192624 A1 Aug. 2, 2012

Related U.S. Application Data

(63) Continuation of application No. 12/301,334, filed as application No. PCT/IB2007/051704 on May 7, 2007, now Pat. No. 8,191,540.

(30) Foreign Application Priority Data

May 18, 2006 (ZA) ................................ 2006/04017

(51) Int. Cl.
*F02P 23/00* (2006.01)
*G01M 15/11* (2006.01)

(52) U.S. Cl.
USPC ................ 123/406.26; 123/143 B; 73/114.67

(58) Field of Classification Search
USPC .......... 73/114.67; 123/406.22, 406.26, 406.3, 123/143 B
See application file for complete search history.

(56) References Cited

U.S. PATENT DOCUMENTS

| | | | | |
|---|---|---|---|---|
| 3,524,438 A | | 8/1970 | Janisch | |
| 4,677,960 A | | 7/1987 | Ward | |
| 4,679,540 A | | 7/1987 | Abe | |
| 5,044,348 A | | 9/1991 | Ookawa | |
| 5,045,964 A | | 9/1991 | Bennett | |
| 5,163,411 A | | 11/1992 | Koiwa | |
| 5,193,514 A | | 3/1993 | Kobayashi et al. | |
| 5,755,206 A | * | 5/1998 | Takahashi et al. | 123/406.37 |
| 5,811,670 A | | 9/1998 | Nolte | |
| 5,945,828 A | * | 8/1999 | Katogi et al. | 324/399 |
| 6,029,627 A | * | 2/2000 | VanDyne | 123/435 |
| 6,073,611 A | * | 6/2000 | Ohuchi et al. | 123/435 |
| 6,142,130 A | | 11/2000 | Ward | |
| 6,186,129 B1 | * | 2/2001 | Butler, Jr. | 123/620 |
| 6,270,591 B2 | | 8/2001 | Chiriac et al. | |

(Continued)

FOREIGN PATENT DOCUMENTS

| | | |
|---|---|---|
| DE | 3532831 | 4/1986 |
| DE | 3931947 | 4/1990 |

(Continued)

OTHER PUBLICATIONS

International Search Report prepared by the European Searching Authority on Oct. 19, 2007, for International Application No. PCT/IB2007/051704.

*Primary Examiner* — Erick Solis

(74) *Attorney, Agent, or Firm* — Sheridan Ross P.C.

(57) ABSTRACT

An ignition system (10) comprises a spark plug (12) having a first end (14) defining a spark gap (16) between a first electrode (18) and a second electrode (20). A transformer (46) comprises a primary winding 44 and a secondary winding (50) also forms part of the system. The secondary winding is connected in a secondary circuit to the first electrode 18 and the secondary winding has a resistance of less than 1KΩ and an inductance of less than 0.25 H. A drive circuit (26) is connected to the primary winding.

13 Claims, 8 Drawing Sheets

(56) References Cited

U.S. PATENT DOCUMENTS

| | | | | |
|---|---|---|---|---|
| 6,378,514 | B1 | 4/2002 | Kaminaga | |
| 6,536,406 | B2 * | 3/2003 | Matsubara et al. | 123/310 |
| 6,545,415 | B1 | 4/2003 | Ward | |
| 6,550,456 | B1 * | 4/2003 | Uchida et al. | 123/479 |
| 6,608,543 | B2 | 8/2003 | Rapoport et al. | |
| 6,722,183 | B2 * | 4/2004 | Kiess et al. | 73/35.08 |
| 7,086,382 | B2 * | 8/2006 | Daniels et al. | 123/406.23 |
| 7,137,385 | B2 * | 11/2006 | Newton | 123/630 |
| 7,677,230 | B2 * | 3/2010 | Meyer et al. | 123/638 |
| 8,191,540 | B2 | 6/2012 | Visser et al. | |
| 2001/0017125 | A1 * | 8/2001 | Matsubara et al. | 123/310 |
| 2002/0069696 | A1 | 6/2002 | Hatazawa | |
| 2003/0164025 | A1 * | 9/2003 | Kiess et al. | 73/35.08 |
| 2004/0094124 | A1 | 5/2004 | Viele | |
| 2004/0154592 | A1 | 8/2004 | Fujima et al. | |
| 2006/0042355 | A1 | 3/2006 | Zhu | |
| 2007/0159047 | A1 * | 7/2007 | Ishinada | 313/143 |

FOREIGN PATENT DOCUMENTS

| | | |
|---|---|---|
| DE | 4116298 | 11/1991 |
| DE | 19614388 | 7/1997 |
| EP | 1600617 | 11/2005 |
| FR | 2127977 | 10/1972 |
| JP | 5180134 | 7/1993 |
| JP | 6200861 | 7/1994 |
| JP | 9068149 | 3/1997 |
| JP | 2002236648 | 8/2002 |
| JP | 2004161082 | 6/2004 |
| JP | 2007117495 | 5/2007 |
| NL | 1021606 | 4/2004 |
| WO | WO 2006/133752 | 12/2006 |

* cited by examiner

IGNITION SYSTEM

CROSS REFERENCE TO RELATED APPLICATIONS

This application is a continuation of U.S. application Ser. No. 12/301,334, filed on Apr. 9, 2009, which is a national stage application under 35 U.S.C. 371 of PCT Application No. PCT/IB2007/051704 having an international filing date of 7 May 2007, which designated the United States, which PCT application claimed the benefit of South African Application No. 2006/04017 filed 18 May 2006, the entire disclosure of each of which are incorporated herein by reference.

INTRODUCTION AND BACKGROUND

This invention relates to an ignition system and more particularly to an ignition system for an internal combustion engine. The invention also relates to an alternative spark-plug, a drive circuit for a spark-plug and associated methods.

It is known that an ignition system for a vehicle comprises a plurality of distributed spark-plugs connected by respective high voltage power cables to a remote and central high voltage generation means. In a known capacitor discharge ignition system, the high voltage generation means comprises a capacitor connected with a power switching device, such as an SCR switch, in series with a primary winding of a transformer. A secondary winding is connected to the high voltage cables. In use, when a piston of the engine reaches a predetermined position, the power switching device is switched to the closed state. Energy in the capacitor is then transferred to the primary winding resulting in a much higher voltage on the secondary, because of the secondary to primary winding ratio. Once the voltage on the secondary reaches the breakdown voltage of a spark-gap between spark electrodes of the plug, a plasma discharge is created between the spark electrodes.

In the known systems, the switching circuit restricts the minimum inductance of the transformer that can be used. The restricting factors are the maximum current rating of the switch, $I_m$, the switching speed of the switch $t_s$, the switching voltage of the switch, $V_s$, and the cost of the switch. These limitations result in a very high secondary winding inductance, which has several drawbacks including cost. The large inductance normally requires kilometres (ten thousands of windings) of thin copper wire, which is expensive. The systems are inefficient in that the kilometres of thin copper wire have a resistance of a few kilo-ohms. To transfer enough energy for a reliable spark, a large amount of extra energy is required for each spark. Due to the large amount of energy that must be handled as well as the large amount of copper needed, the systems are bulky. The energy loss due to the copper resistance, heats the transformer. This places a severe limit on the maximum amount of energy that can be transferred to the spark and also affects the placement of the transformer for cooling. The fuel efficiency, completeness of combustion, combustion time, exhaust cleanliness and variability in cycle-to-cycle combustion are limited. Because the transformer is large and heats up, it is normally positioned a distance away from the engine. This requires high voltage cables between spark-plugs and the transformer. These high voltage cables generate a large amount of electromagnetic radiation, which may influence other electronic equipment. In order to eliminate the high voltage cables, coil-on-plug systems which comprise an ignition coil at each spark-plug are used. Because these coils are very close to the engine, normally with very little air flow around them, they overheat easily, which makes them unreliable.

Some ignition coils having a very low secondary resistance have been suggested. This is accomplished by using a magnetic path having a high permeability, to reduce the number of windings while keeping the inductance high enough for the switching circuit. The disadvantage of this approach is that the high permeability magnetic material saturates easily and that a large core is therefore required.

Some other ignition systems have a second energy transfer path on the secondary side. They all have the disadvantage that the energy must either go through the secondary winding or through a semiconductor device. If the energy goes through the secondary winding, the transfer is very inefficient due to the high winding resistance. On the other hand, the semiconductor device must be a high voltage (normally above 30 kV), high current (normally above 1 A) device. These devices are expensive and also result in energy loss.

Another disadvantage of all these systems is that the self-resonance frequency of the secondary winding is low (typically less than 20 kHz). The low self-resonance frequency is due to the long length of secondary wire and the large secondary winding inductance. When the secondary winding is connected in a secondary side circuit, the resonance frequency of the secondary side circuit is even lower than the self-resonance frequency of the secondary winding, due to the spark-plug and cable capacitance. Because of the low secondary resonance frequency, it takes some tens of microseconds to charge the spark-plug or electrode capacitance to a breakdown voltage and also some tens of microseconds to dissipate the remaining secondary energy. This limits the number of successive pulses that can be generated in multiple spark ignition systems, which limits the amount of energy that can be delivered during ignition. The efficiency and amount of energy transferred in some ignition systems are increased by placing a capacitor in parallel with the spark-plug. In these systems the secondary resonance frequency will be even lower. Even in systems where an optimal spark time is calculated (as discussed below), the spark cannot be controlled to within a few tens of microseconds. At 6000 rpm, this inaccuracy is larger than one degree in engine rotation.

It is a known technique to use the spark-plug to measure the current in or resistance of the ionized gas after ignition to gain information about the gas temperature, pressure or composition after combustion. This information is then used as one of the inputs to an engine management system to calculate an average optimal spark time. Because of the high loss of the ignition transformer, the measurement must be done on the secondary side of the transformer, which makes the secondary side circuit complex.

Due to cycle-to-cycle variations, the average optimal spark time can be quite different from the optimal spark time for a single cycle. Although there are a number of techniques available to measure the conditions inside the combustion chamber before ignition, none of them are widely used because they all require extra access points to the combustion chamber, are expensive, most have low reliability and are complex.

When using the spark-plug for measurements, the low secondary resonance frequency therefore limits the measuring frequency after ignition and also makes it very difficult, if not impossible, to measure gas properties before ignition.

Object of the Invention

Accordingly, it is an object of the present invention to provide an alternative ignition system, spark-plug, drive circuit for a spark-plug and associated methods with which the applicant believes the aforementioned disadvantages may at least be alleviated.

SUMMARY OF THE INVENTION

According to the invention, an ignition system comprises:
- a spark-plug having a first end defining a spark-gap between a first electrode and a second electrode;
- a transformer comprising a primary winding and a secondary winding, the secondary winding being connected in a secondary circuit to the first electrode and the secondary winding having a resistance of less than 1 kΩ and an inductance of less than 0.25 H; and
- a drive circuit connected to the primary winding.

The drive circuit may comprise an insulated gate semiconductor device and the primary winding of the transformer may be connected in a drain source circuit of the insulated gate semiconductor device.

The drive circuit may comprise a charge storage device discharge circuit comprising at least a first charge storage device, such as at least one capacitor.

The drive circuit may comprise a gate circuit connected to a gate of the insulated gate semiconductor device, the gate circuit comprising the first charge storage device and a fast switching device and being configured to dump on the gate of the insulated gate semiconductor device sufficient charge for a pre-selected conduction state of the insulated gate semiconductor device, before current starts to flow in the drain source circuit of the insulated gate semiconductor device.

In another embodiment the drive circuit may comprise a high frequency power oscillator.

The oscillator may be configured to oscillate at substantially a resonance frequency of the secondary circuit. The oscillator may have a frequency of more than 10 kHz, more than 100 kHz or even more than 500 kHz or even more than 1 MHz.

The drive circuit, transformer and spark-plug may all be located in a single housing with the spark-gap exposed at one end of the housing. The housing is preferably made of an electricity conductive material, such as a suitable metal, to act as a Faraday cage. It will be appreciated that with the Faraday cage, electromagnetic interference transmitted, in use, is shielded or suppressed.

The constant current and/or voltage source may be located externally of the housing and may be connectable to the housing via cables extending from the housing towards a second end of the housing.

The coupling between the primary winding and the secondary winding of the transformer may be less than 80% ($k<0.8$), alternatively $k<0.6$, alternatively $k<0.4$, alternatively $k<0.2$.

The transformer may comprise a core having square hysteresis.

The resistance of the secondary winding may be less than 100Ω, alternatively less than 50Ω, alternatively less than 20Ω, alternatively less than 10Ω.

The inductance of the secondary winding may be less than 100 mH, alternatively less than 50 mH, alternatively less than 20 mH, alternatively less than 3 mH, alternatively less than 1 mH.

The inductance of the primary winding may be less than 5 μH.

The self-resonance frequency of the secondary winding may be higher than 10 kHz, alternatively higher than 100 kHz, alternatively higher than 500 kHz and alternatively higher than 1 MHz.

According to another aspect of the invention there is provided a capacitor discharge drive circuit for a spark-plug, the circuit comprising a capacitor and a primary winding of a transformer connected in a drain source circuit of an insulated gate semiconductor device, a secondary winding of the transformer being connected to the spark-plug. The insulated gate semiconductor device may be driven by a gate circuit comprising a capacitor and a fast switching device to dump onto a gate of the device, before the device switches on, sufficient charge for a pre-selected conduction state in the drain source circuit of the device.

According to another aspect of the invention there is provided a spark-plug comprising a first electrode and a second electrode defining a spark-gap, forming an electrode capacitor and configured such that the plug may in use selectively be driven to generate a corona only at any of the electrodes, or, to generate a corona at any of the electrodes before a spark is created over the gap.

The electrodes may be configured such that energy stored in the electrode capacitor at a corona generating threshold at any of the electrodes is substantially less than the energy required to create a spark over the spark-gap.

The first electrode may extend axially as a core for a generally elongate cylindrical body of an insulating material comprising a first end and a second end; the first electrode terminating at a first end of the electrode spaced inwardly from the first end of the body; the body defining a blind bore extending from the first end of the body and terminating at the first end of the first electrode; and the second electrode being located towards the first end of the body, thereby to provide the electrode capacitor between the first electrode and the second electrode and, in use, a second capacitor between a created corona region in the bore and the second electrode.

Yet further included within the scope of the present invention is a method of monitoring at least one parameter associated with a gaseous substance in a chamber, the method comprising the steps of:
- utilizing a first electrode and a second electrode, at least one of which is exposed to the substance and which collectively define a gap and form an electrode capacitor, to generate a corona at the at least one electrode;
- causing the corona to change an electrical parameter in a region of the at least one electrode which is indicative of the at least one gas parameter;
- causing a signal relating to the electrical parameter to be sensed by electronic circuitry connected to the electrodes; and
- measuring the signal sensed by the circuitry, to monitor the at least one gas parameter.

The electrodes may form part of a spark-plug configured such that energy stored in the electrode capacitor at a corona discharge threshold at any of the electrodes is substantially less than the energy required to create a spark over the gap; and the method may comprise the step of driving the electrodes with a signal to generate said corona, or, to generate said corona before forming a spark over the gap.

The voltage signal may be a fast rise-time voltage signal, which is one of an edge of a single voltage pulse and an edge of a continuous wave. The rise time of the fast rise-time voltage may be high enough to generate a positive or negative corona at one or both of the electrodes. The rise-time may be faster than 100 kV/μs.

In another form of the method an amplitude of the voltage signal may be one of smaller than, equal to and larger than a positive or negative corona threshold voltage of the substance in a region of the spark-gap. The amplitude of the voltage signal may be one of smaller than, equal to and larger than a breakdown voltage for the spark-gap.

The signal may be fed back to a primary side of a transformer, a secondary winding of which is connected to at least one of the electrodes and wherein the measurement is done on the primary side.

The gas parameter may be monitored before and/or during and/or after ignition of the substance.

The gas parameter may be used to determine at least one of the timing of and energy in a spark over the gap.

The gas parameter may be any one or more of pressure in the chamber, composition of the substance and position of a piston moving in the chamber.

The method may comprise the step of varying an output power level of a drive circuit for the electrodes between a first lower level suitable to create said corona discharge for the measurements, to a second higher level to form a spark and to transfer energy for ignition. The second power level may be dependent on results of the measurements.

BRIEF DESCRIPTION OF THE ACCOMPANYING DIAGRAMS

The invention will now further be described, by way of example only, with reference to the accompanying diagrams wherein FIG. 1 is a diagrammatic representation of an ignition system according to the invention;

FIG. 2 is a circuit diagram of a first embodiment of a capacitor discharge drive circuit forming part of the system according to the invention;

FIGS. 3(*a*) to 3(*c*) are voltage waveforms at points 3*a*, 3*b* and 3*c* in FIGS. 6 and 2;

Figure 9:
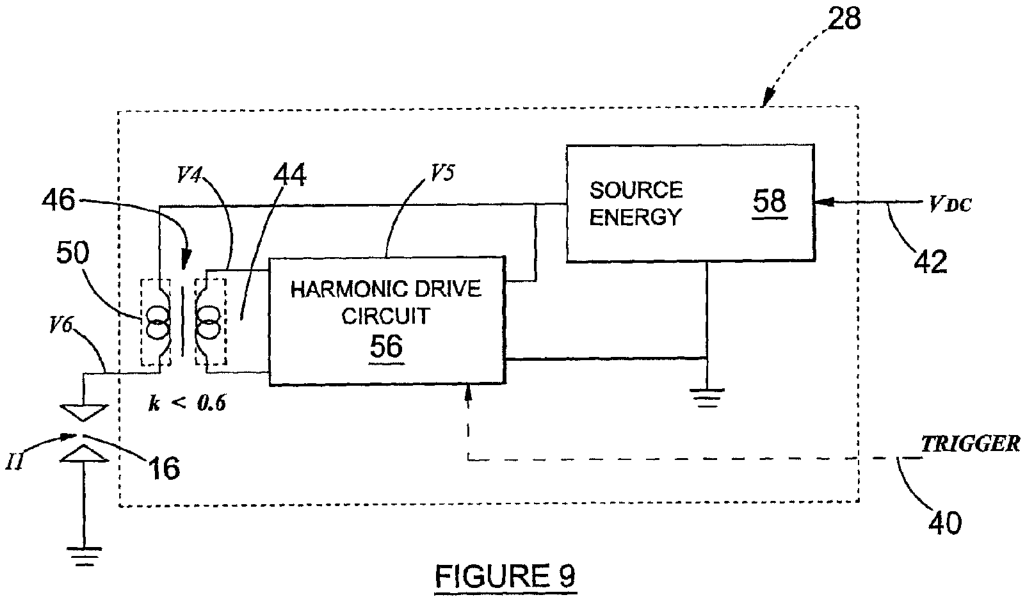
FIG. 9 is a block diagram of the system with another embodiment of the driving circuit.
Figure 10:
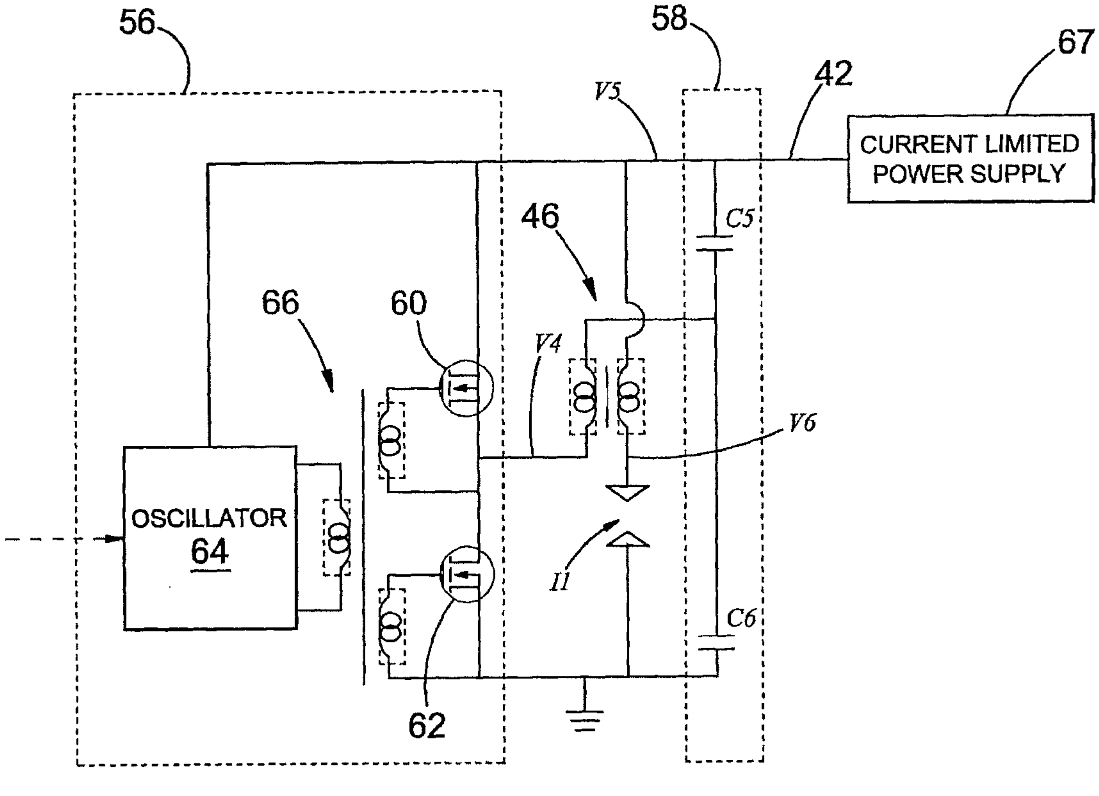
FIG. 10 is a more detailed diagram of the system in FIG. 9.
Figures 11A, 11B, 11C, 11D:
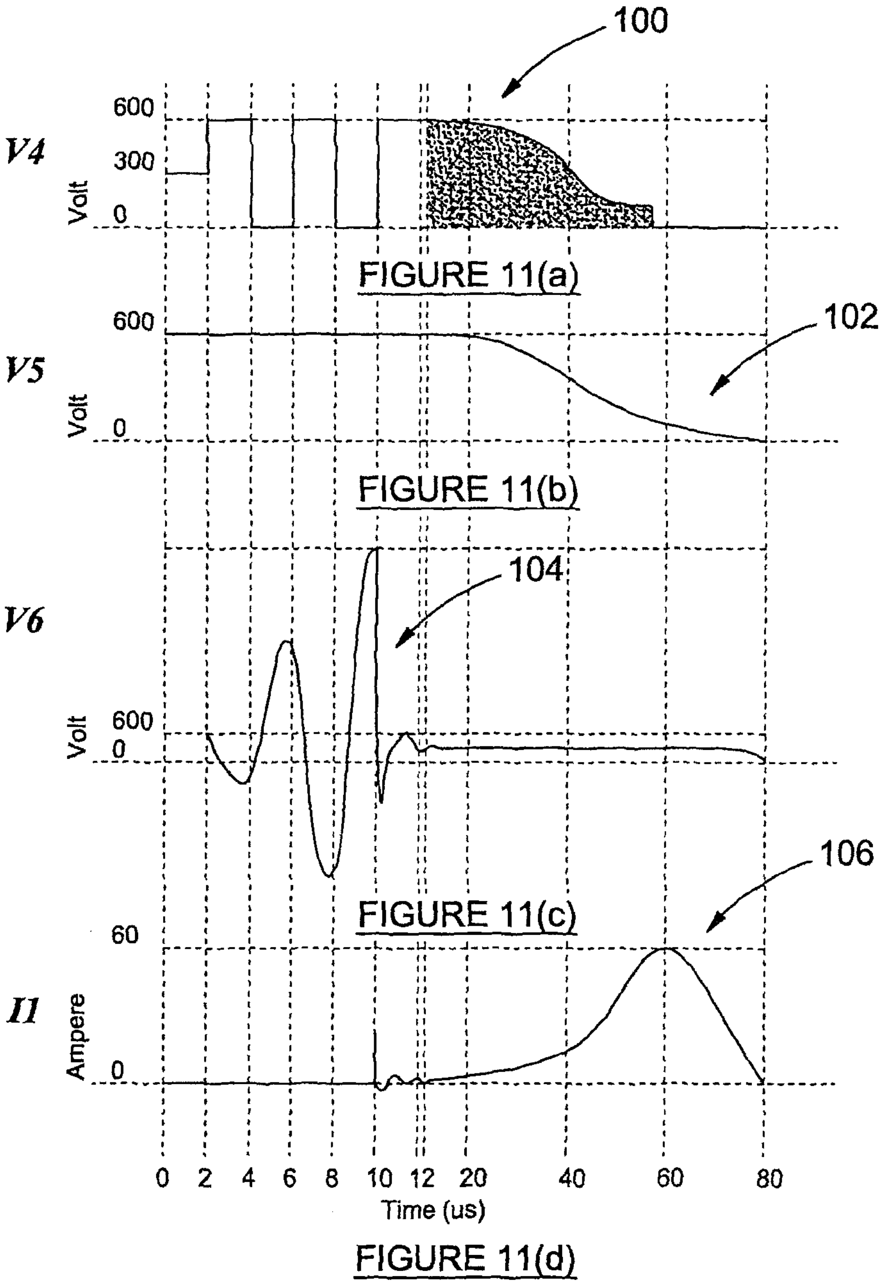
Figure 12:
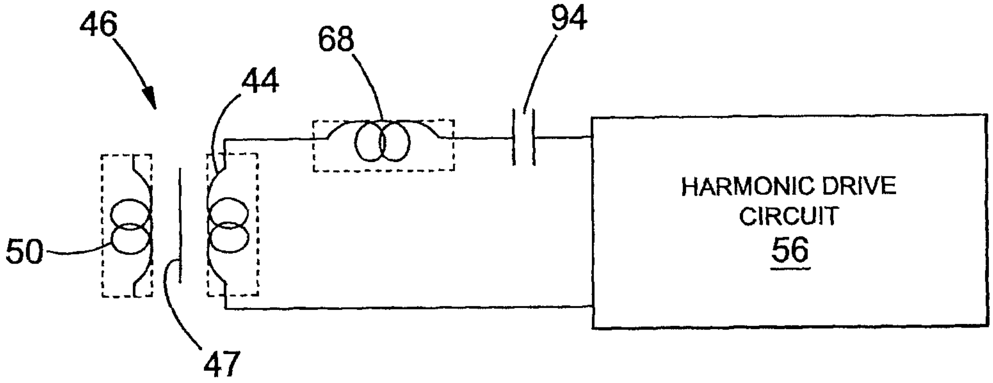
Figure 13:
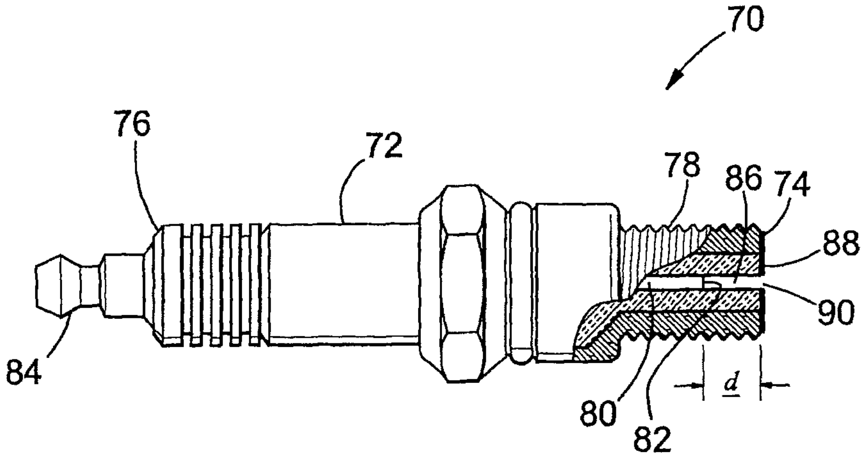

FIGS. 11(*a*), (*b*), (*c*) and (*d*) are voltage and current waveforms at selected positions in FIGS. 9 and 10;

FIG. 12 is an alternative embodiment of part of the drive circuit in FIGS. 9 and 10; and FIG. 13 is a diagrammatic representation, partially broken away, of an alternative spark-plug.

DESCRIPTION OF A PREFERRED EMBODIMENT OF THE INVENTION

Figure 1:
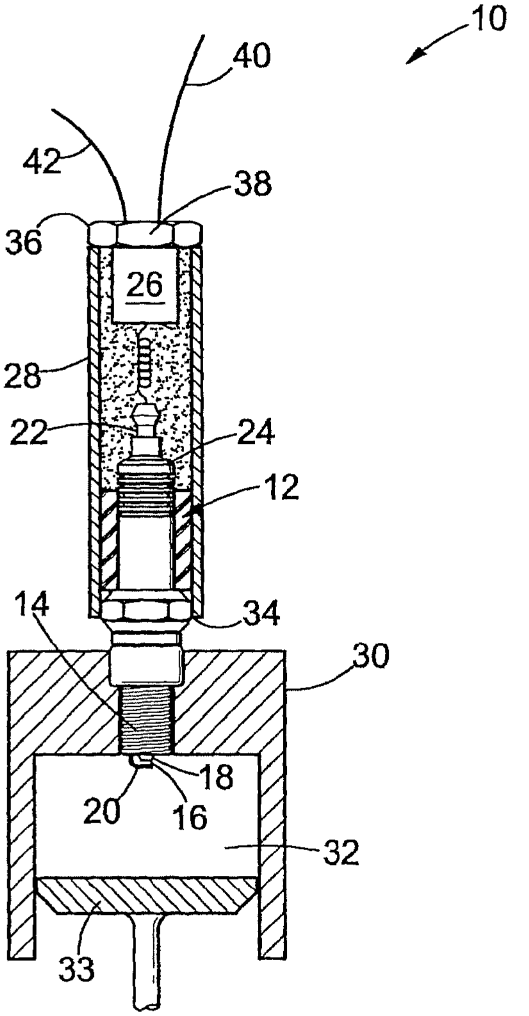

An ignition system according to the invention is generally designated by the reference numeral 10 in FIG. 1.

The system 10 comprises an elongate spark-plug 12 having a first end 14 defining a spark-gap 16 between a first high voltage electrode 18 and a second electrode 20. A connection terminal 22 to the first electrode is provided at second end 24. The system 10 further comprises a drive circuit 26 for the plug 12, which circuit will be described in more detail hereinafter.

The spark-plug 12 and drive circuit 26 are located in a housing 28 made of a suitable material, such as a suitable metal, to act as a Faraday cage. The housing is tubular in configuration. A metal part of the plug towards the first end 14 thereof and which also provides a thread for securing the plug to the engine block 30, extends beyond a first end 34 of the housing 28, so that the gap is exposed at the first end of the housing and, in use, the gap 16 is located in the combustion chamber 32. At an opposite or second end 36 of the housing, there is provided a hole 38 for cables 40,42 (which will be referred to in more detail hereinafter) extending to the system 10.

It is believed that with the aforementioned self-contained system comprising cage 28 enclosing and shielding plug 12 and drive circuit 26, electromagnetic interference emitted by the high voltage switching circuitry is suppressed.

It is further believed that the system 10 according to the invention comprising a spark-plug 12 and drive circuit 26 therefor located in a single housing 28, may also reduce the under vehicle hood complexity by eliminating the central transformer, capacitor discharge assembly and high voltage cables extending to the distributed spark-plugs. It is believed that maintenance may be simplified.

Figure 2:
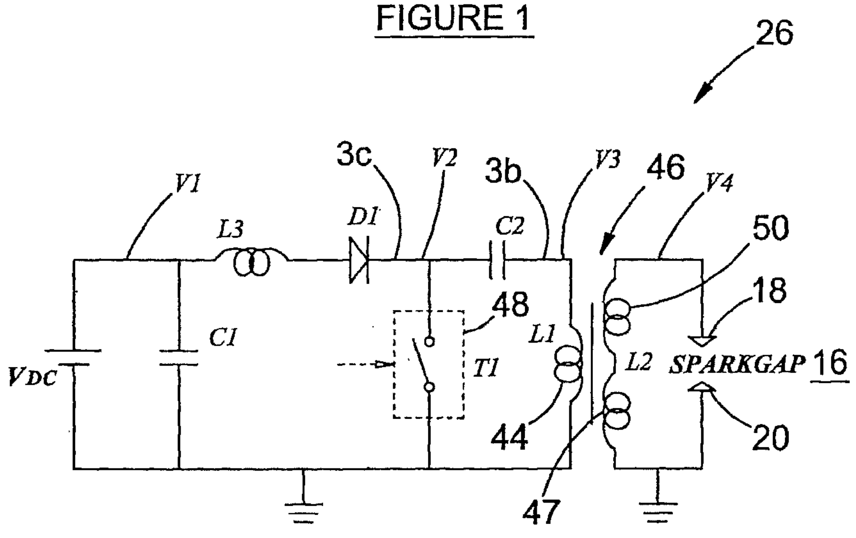

A first embodiment of the drive circuit 26 (in the form of a capacitor discharge circuit) is shown in more detail in FIG. 2. The circuit 26 comprises a first capacitor C2 connected in series with a primary winding 44 of a local transformer 46 and a fast switching power device T1 or 48. A secondary winding 50 of the transformer is connected to the first electrode 18, which defines spark-gap 16 with grounded second electrode 20.

The power switching device 48 may comprise a power insulated gate semiconductor device, such as a MOSFET or IGBT and is preferably driven in accordance with the method of and with a drive circuit of a kind similar to that disclosed in the applicant's U.S. Pat. No. 6,870,405B1, the contents of which is incorporated herein by this reference.

Figure 3A:
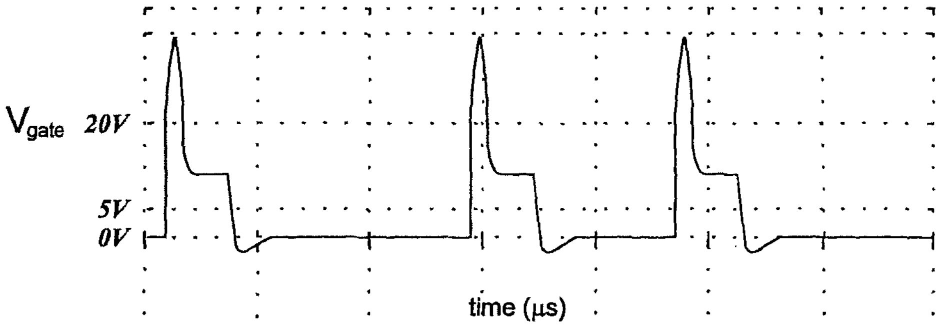
Figure 3B:
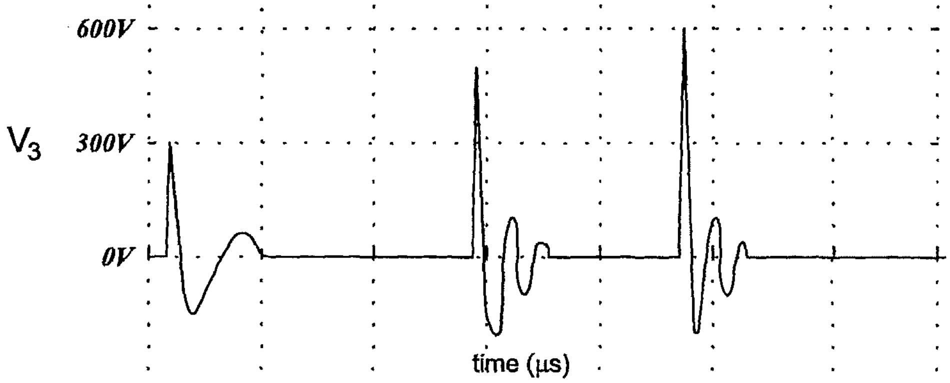
Figure 3C:
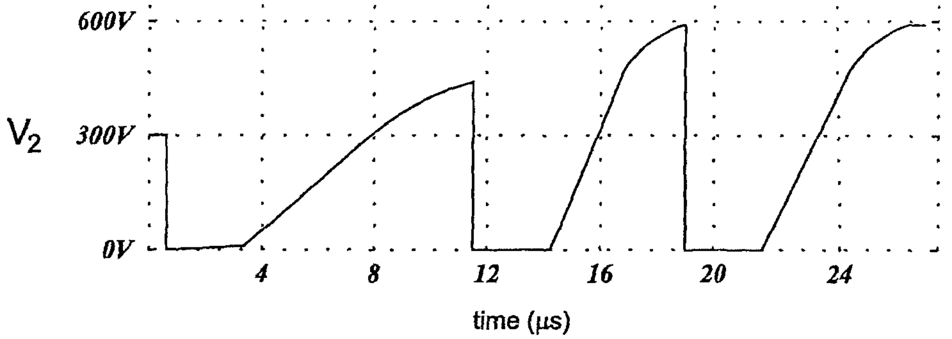
Figure 6:
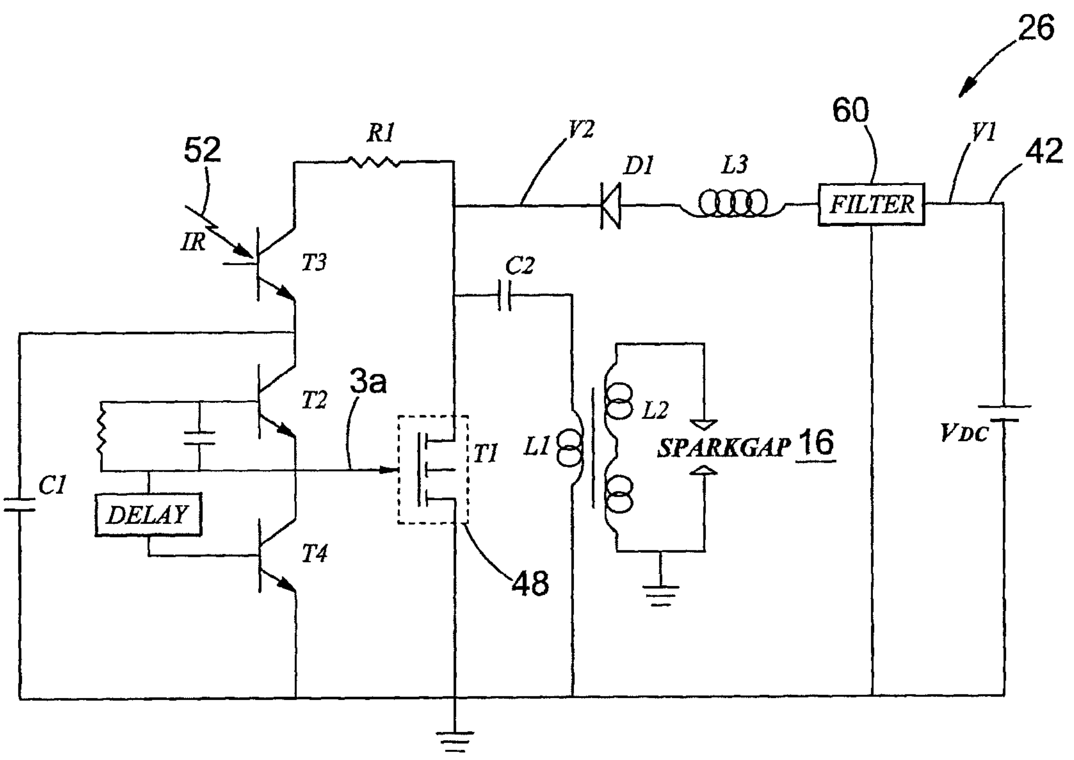
FIG. 6 is a circuit diagram of a fourth embodiment of the drive circuit.

As best shown in FIGS. 2 and 6, the circuit 26 utilizes a single MOSFET 48 to generate a voltage of a few hundred volts to charge capacitor C2 as well as to switch the capacitor C2 to generate the high voltage across the gap 16. In FIGS. 3(*a*) to 3(*c*) there are shown voltage waveforms at points 3*a* in FIGS. 6 and 3*b* and 3*c* in FIG. 2. A short duration voltage pulse which is applied to the gate of the MOSFET 48 to dump or transfer sufficient charge onto the gate of the MOSFET, to switch the MOSFET on, i.e. to a desired state of conductivity in a drain source circuit of the MOSFET, is shown in FIG. 3(*a*). Referring now in particular to FIG. 2, when a DC voltage V1 is applied to the circuit for the first time, the capacitor C2 is charged to the steady state voltage V2=V1. When the MOSFET is switched on, capacitor C2 discharges through the transformer primary 44. The energy on capacitor C2 is not only dissipated in a plasma spark in gap 16, but also in the transformer 46 and transistor 48. After the capacitor discharge, the voltage on the capacitor C2 is almost zero. As long as the transistor 48 is on, the current through inductor L3 increases, storing energy in the inductor. When the transistor 48 is switched off, the capacitor C2 is charged through the diode Dl and inductor L3. While the voltage V2 across the capacitor C2 is less than the supply voltage V1, the current through the inductor L3 continues to increase. Once V2>V1, the current through the inductor decreases, while all the energy stored in the inductor L3 is transferred to the capacitor C2. When the current in the inductor L3 reaches zero, the capacitor C2 stays charged until the transistor 48 is switched on again. As can be seen in FIG. 3(*c*), the first cycle takes about 12 μs and thereafter the capacitor discharge cycle can be repeated every about 8 μs. At a high engine revolution speed of say 6000 rpm, the engine rotates at 46 μs per degree.

Hence, a substantial number of the aforementioned cycles may be completed before top dead centre.

If the MOSFET 48 is on for a short interval only, almost no energy is stored in the inductor L3. The final voltage V2 then may go to about double the supply voltage V1. If the MOSFET is kept on for a longer period, a voltage V2 higher than 2*V1 may be reached.

In a prototype of the system 10, a supply voltage V1 of 300V is used to charge the capacitor to about 600V. If there is still some energy left on the capacitor C2 when the MOSFET 48 is switched off after the capacitor discharge, the voltage V2 will not reach 2*V1. This may be compensated for, by keeping the MOSFET on for a suitable time period, so that enough energy may be stored on the inductor L3.

The circuit 26 may be operated from a supply voltage V1 as low as 14V. This can be achieved by keeping the MOSFET 48 on long enough to store enough energy in the inductor L3, so that the capacitor may be charged to 600V. It will be appreciated that this will increase the period of the cycle.

Figure 4:
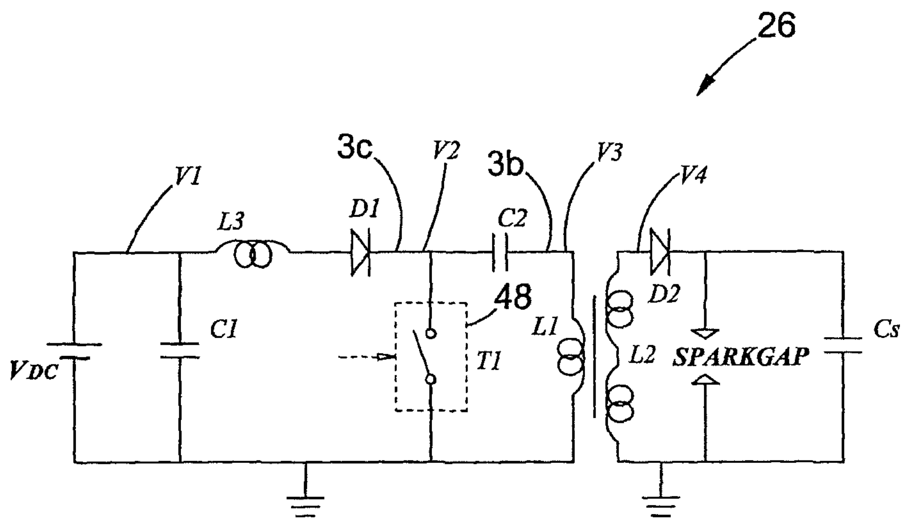
FIG. 4 is a circuit diagram of a second embodiment of the drive circuit.

Referring to FIG. 4, if the energy stored on capacitor C2 is not enough to charge the secondary side total capacitance to 30 kV, a high voltage diode D2 may be used on the secondary side of the transformer 46. For each capacitor discharge cycle, the spark-plug or electrode capacitance Cs is charged further until the breakdown voltage is reached. The spark-plug capacitance may be increased with an additional high voltage capacitor (not shown) in parallel, in order to increase the energy transferred to the plasma in the first few nanoseconds.

Figure 5:
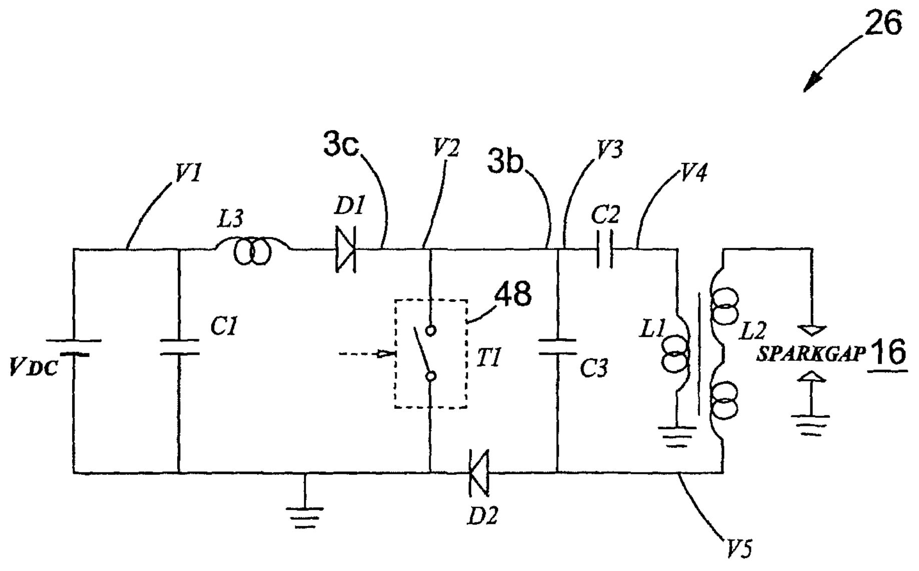
FIG. 5 is a circuit diagram of a third embodiment of the drive circuit.

As shown in FIG. 5, the MOSFET 48 may be protected against reverse over-voltage by adding a capacitor C3 and diode D2. This also provides an additional energy transfer path through the secondary winding 50 to the spark plasma. When MOSFET 48 is off, the capacitor C3 is charged in parallel with capacitor C2 through diode D2. When MOSFET 48 is on, the voltage V2 becomes zero, making V5 negative. After the spark plasma is created by the capacitor discharge, capacitor C3 is discharged through MOSFET 48, secondary winding 50 and the spark plasma, heating the plasma further. This second energy transfer is efficient due to the low secondary winding resistance, is fast due to the low secondary inductance, and it is also controllable with MOSFET 48.

Referring to FIG. 6 (which is an implementation of FIG. 2, using fast MOSFET switching), when a timing signal 52 received via optical cable 40 initiates conduction through transistor T3, capacitor C1 begins to charge through resistor R1 from the voltage on capacitor C1. Capacitor C1 has a much higher capacitance than capacitor C2. Once the voltage on C1 reaches the avalanche voltage of transistor T2, transistor T2 switches on, dumping the charge on C1 onto the gate of MOSFET 48 as hereinbefore described. This charge then switches on MOSFET 48 in less than a nanosecond. A capacitor discharge then takes place from capacitor C2 as hereinbefore described. When the MOSFET 48 is on, the gate voltage is used to switch on the transistor T4 after a delay time $t_{on}$. Transistor T4 then pulls the voltage at the gate of MOSFET 48 low, thereby switching the MOSFET 48 off. Once the MOSFET 48 is off, capacitor C2 charges as hereinbefore described and the whole cycle is repeated. The circuit 26 in FIG. 6 hence operates as a self-oscillating circuit for as long as timing signal 52 is received via cable 40. A filter 60 may be provided in the DC voltage supply cable 42 and located in the housing 28, thereby to further suppress electromagnetic interference.

When using known spark-plugs, an energy of about 5 mJ is necessary to charge the spark-plug capacitance Cs of about 10-15 pF to 20 kV-30 kV. This energy should also be enough to ignite the fuel in the chamber, provided the fuel/air mixture is not too lean. Due to the parasitic capacitance of the secondary winding 50, which in the known systems would be much more than 15 pF, substantially more than 5 mJ energy must be supplied to the secondary circuit. In the present invention it may be possible to maintain the parasitic capacitance to below 15 pF, which would imply that only an additional about 5 mJ would be required to reach the breakthrough voltage. A minimum capacitance C2 of about 55 nF at 600V is therefore required on the primary side of the transformer 46, to supply the 10 mJ to the secondary. The minimum value for the inductance L1 of the primary winding is limited by the switching speed and maximum current capabilities of the switching device 48. For the MOSFET 48 with associated drive circuit, the switching speed $t_s$<1 ns, requiring L1>18 pH to prevent switching losses. In the aforementioned prototype, the maximum current capability of the MOSFET using the aforementioned drive method and circuit is about 120 A during the initial 100 ns. This gives a lower limit value for the inductance L1>1.4 μH and for the secondary inductance L2>3.5 mH. The aforementioned maximum current capability therefore sets the lower limit value for the inductance L1, which is substantially lower than that dictated by the switching speeds of the known SCR technology.

It is believed that the system according to the invention is more power efficient than the known systems. Because of the fast switching time of the MOSFET 48, the inductances associated with the transformer 46 may be reduced, which will result in the length of wire be reduced and consequently the size of the transformer and inductor resistance. This is expected to result in a secondary wire length of a few tens of meters (compared to some kilometres of wire used in the known capacitor discharge transformers), having a resistance of less than 1Ω, preferably less than 100Ω, more preferably less than a few tens of ohms, such as less than 50Ω, or less than 20Ω and even less than 10Ω. Because the secondary resistance would be less than the spark plasma resistance, most energy is transferred to the plasma.

Due to the low secondary inductance and relative short wire length, the secondary side self-resonance frequency may be expected to be higher than 10 kHz, preferably higher than 100 kHz, further preferably higher than 500 kHz and most preferably higher than 1 MHz. The secondary side resonance frequency will be lower than the self-resonance frequency, and is limited by the loss of the transformer core material. With a ferrite type of core, the secondary side resonance frequency may be between 500 kHz and 1 MHz.

Figure 7:
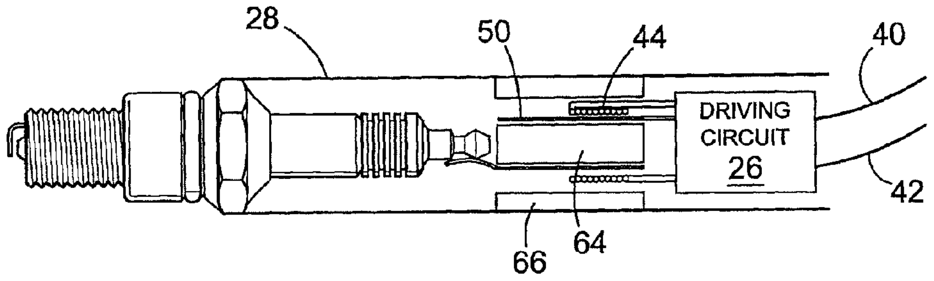
FIG. 7 is an axial section through the ignition system according to the invention showing a transformer in more detail.
Figure 8:
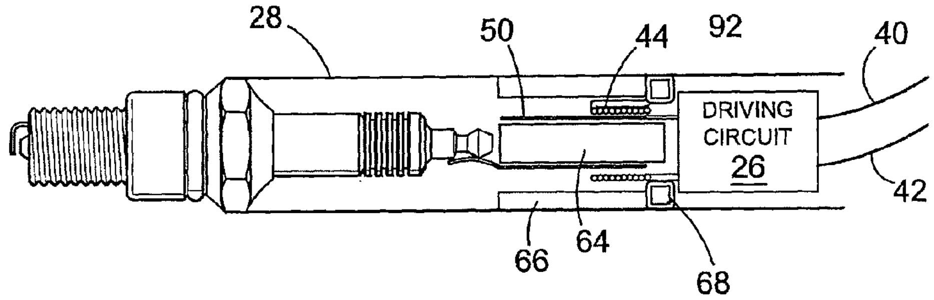
FIG. 8 is a view similar to FIG. 7 of another embodiment of the transformer.

Referring now to FIGS. 7 and 8, where two embodiments of the transformer 46 are shown. The primary winding 44 comprises ten windings of thick copper wire, the secondary winding 50 comprises 400 windings of 0.1 mm copper wire (around 10 m of wire) and the transformer core 47 comprises a ferrite rod 64 and an outer ferrite tube 66. The primary winding has an inductance of 2-4 μH. Weak coupling is accomplished by locating the primary winding towards an end of the rod 64, as shown in FIG. 7 or by adding a toroidal inductor 68 in series with the primary winding 44, as shown in FIG. 8. The toroid may have a core 92 comprising non-magnetic material, or it may comprise part of the core of the transformer. The coupling between the primary winding 44 and the secondary winding 50 of the transformer 46 may be less than 80% (i.e. k<0.8), alternatively k<0.6, further alternatively k<0.4, and still further alternatively k<0.2. The secondary winding may comprise a single layer of winding as shown in FIG. 7, alternatively it may comprise more than one layer, as shown in FIG. 8. Parallel layers reduce resistance, while maintaining the same inductance, winding ratio and core. The secondary winding has a resistance of about 20Ω for a single layer and a resistance of about 10Ω for a dual layer, an inductance of about 3 mH and a self-resonance frequency of about 500 kHz. As stated, the inductance of the secondary winding is preferably less than 250 mH, preferably less than 100 mH, preferably less than 50 mH, further preferably less than 20 mH, more preferably less than 10 mH, even more preferably less than 3 mH and most preferably less than 1 mH. Ferrite material may be added at one of the two ends of the transformer connecting the inner rod 64 and outer tube 66 magnetically.

A second embodiment of the drive circuit 26 is shown in more detail in FIG. 9. In this embodiment, the primary winding 44 of the transformer 46 is connected to a power oscillator 56. This oscillator 56 is connected to an energy source 58, all inside the housing 28. The energy source is connectable via cable 42 to DC voltage source outside of the housing and the oscillator has a trigger input connection via cable 40 to the outside of the housing. The secondary winding 50 of the transformer 46 is weakly coupled to the primary winding 44. The secondary winding 50 is connected in series with the spark-plug 12 and the energy source 58. The secondary winding inductance, capacitance and the spark-gap capacitance forms an LC resonance circuit with a certain resonance frequency. The transformer 46 may have a core 47 with a square hysteresis, this means that the secondary winding will have a relatively high inductance for low current, but at a certain higher current, the inductance will suddenly become much smaller.

FIG. 10 shows a further embodiment of the harmonic summation drive circuit, where two power MOSFETs 60,62 are used in the power oscillator 56. An oscillator 64, which starts oscillating when it receives a trigger, is driving the gate of the MOSFETs 60,62 through a transformer 66. The energy source 58 comprises two energy storage capacitors C5 and C6. The energy source 58 is connected via cable 42 to a voltage and/or current limited power supply 67 externally of the housing 28.

The embodiments in FIGS. 9 and 10 will be explained with reference to the voltage and current waveforms, shown in FIGS. 11(*a*) to (*d*). Some energy is stored in the energy source 58 by the external constant voltage or constant current supply 67. When an external trigger is received via input 42, the power oscillator starts to oscillate at the secondary resonance frequency, as shown at 100 in FIG. 11(*a*). Due to the weak coupling between the primary and secondary windings, during each cycle, some energy is transferred to the secondary resonance circuit. The energy in the energy source 58 decreases with each cycle as shown at 102 in FIG. 11(*b*), while an AC voltage across the spark-gap 16 increases, as shown at 104 in FIG. 11(*c*). The circuit behaves similarly to a series resonant circuit that is driven at its resonance frequency. When, after a few cycles of the oscillation, the breakthrough voltage of the spark-gap 16 is reached, almost all the energy that was transferred to the secondary side is dissipated in the spark-gap. After the breakthrough, the oscillator may keep on oscillating and thereby still transfer energy through the transformer 46 to the spark. This energy transfer is quite efficient because of the low resistance of the secondary winding 50. As soon as a plasma is formed between the spark electrodes, the energy source 58 generates another current directly through the plasma and secondary winding 50. Because the inductance of the secondary winding is in the order of 1 mH, the current increases at a rate of about 0.5 A/μs. If the core 47 saturates after a few microseconds, the inductance of the secondary winding 50 will become smaller as aforesaid. The current will then increase faster (more than 3 A/μs) as shown at 106 in FIG. 11(*d*). If the spark is quenched in some way, the oscillator will automatically generate a high voltage again to sustain the spark. Energy will therefore be transferred to the spark until the energy source 58 is depleted.

If the breakthrough voltage is reached within about 4 cycles, the frequency of the oscillator does not need to be the exact secondary resonance frequency, but may differ by a few percent. This makes feedback from the secondary side to the oscillator unnecessary and leaves enough tolerance for variation in the resonance frequency, due to temperature variations and different spark-plug designs.

As illustrated in FIG. 12, an inductor 68 and capacitor 94 may be added in series with the primary winding 44. The main purpose of this introduction is to save-guard the harmonic drive circuit 56 against high frequency high energy return pulses. It also makes it possible to reduce the winding ratio and reduce the number of windings for the secondary winding 50 of the high voltage transformer 46.

Because, in the harmonic summation drive, a smaller amount of energy is transferred during each cycle than in the conventional capacitor discharge ignition (CDI) systems, smaller secondary inductance and resistance are possible for the same switching device. This drive makes it possible to decrease the winding ratio of the transformer 46 to less than 1:25 with a 600V switching device 48, which in a conventional CDI system would require a ratio of more than 1:50. This makes it possible to reduce the secondary inductance with another factor of 4, which will also decrease the secondary resistance and increase the self-resonance frequency. An additional advantage is that the drive circuit is protected from feedback of high-energy pulses on the secondary side, due to the weak coupling.

Referring to FIG. 13, an alternative spark-plug is also provided. The alternative spark-plug 70 comprises an elongate, generally cylindrical ceramic body 72 having a first end 74 and a second end 76. A first electrode 80 extends as core centrally along the body and terminates at a first end 82 thereof a distance d from the first end 74. A second end of the first electrode 80 is electrically connected to a contact or terminal 84 at the second end 76. A second electrode 78 located towards the first end of the body may be threaded. The plug hence defines a blind bore 86 extending from the first end 74 thereof and terminating at the first end 82 of the first electrode. An annular element 88 defining a centre hole 90 clads the end 74 of the body and is in electrical contact with the second electrode. The bore 86 may or may not have a uniform transverse cross sectional area along its length. For example, the bore 86 may be tapered in any direction. The cross sectional area of the hole 90 may be the same, larger or smaller than that of the bore 86.

The spark-plug 70 hence comprises or provides in use a first or electrode capacitor between the first electrode 80 and the second electrode 78,88 and a second corona capacitor between a corona region created, in use and as will hereinafter be described, in the bore and the second electrode 78, 88.

The ceramic body 72 may be thicker (have a larger outer diameter) around the first electrode 80 than around the bore 86. This will make the electrode capacitance smaller than the corona capacitance. The outside of the ceramic body and/or inside of the conductive second electrode 78 may be tapered to increase or decrease the capacitance towards any end of the bore.

When a voltage is applied to the first electrode 80, the electric field strength inside the bore 86 will be much higher at the end 82 of the first electrode, than in the rest of the bore. This makes it possible to apply a high voltage pulse such that the electric field in the bore at the first electrode is high enough to form a corona discharge, but the electric field over the remainder of the bore is well below breakdown.

When such a voltage is applied, a corona discharge takes places at the end 82. If the applied voltage is maintained, the corona will in effect lengthen the first electrode in the direction of the first end 74 of the body and the electric field in the remainder of the bore will increase. The plasma in effect grows from the end 82 of the first electrode towards the second electrode 88, as the corona capacitor is charged. The higher the corona capacitance, the slower the corona will grow. When the corona comes close to the grounded electrode 88, the electric field may reach the breakdown electric field strength and a spark may form.

Because the corona discharge dissipates energy, energy must be supplied to the first electrode to keep the corona growing. If the energy stored in the electrode capacitor and secondary circuit is inadequate to charge the corona capacitor, the corona will only grow a distance and then die out. If more energy is supplied, it may be enough to cause the corona to grow until a spark is created, but may still be less than the minimum required ignition energy.

After each corona discharge, the amount of energy lost in the corona may be used to gain information about the gas temperature, pressure and composition inside the bore without igniting the gas, as will hereinafter be described. More particularly, the corona causes charge separation, which alters the electrical parameters of the gas. The amount of energy lost in the corona and the change in electrical parameters may be used to gain the aforementioned information.

When even more energy is supplied to the spark-plug and dissipated in heating the conductive plasma between the electrodes, the gas will start to ignite, will expand rapidly and blast out into the combustion chamber, igniting the gas. The energy transfer must preferably be fast enough to transfer most of the energy before the plasma blasts out of the bore.

If the supplied energy is not enough (or the voltage pulse is too short) to create a spark, an amount of energy is lost, which depends on the pressure/temperature/gas composition in the chamber 32 shown in FIG. 1 having a moving piston 33. After a capacitor discharge cycle as hereinbefore described, at least part of the remaining energy is transferred or fed back to the primary side of transformer 46, and can be measured on capacitor C2, after the MOSFET 48 is switched off. If the aforementioned harmonic summation drive is used, the amount of energy transferred or fed back to the energy source 58 may also be measured. However, it is only possible to measure on the primary side the energy loss in the corona, if the energy loss in the secondary winding is not too large. The above drive circuits are also necessary to optimally use the alternative spark-plug for combustion, for the low secondary inductance makes a very fast voltage rise time possible for corona discharge under different circumstances.

If a voltage is supplied on the electrodes after the corona is generated and which is too small to sustain the corona, the corona will die out, and the charge that is separated by the corona moves to the electrodes due to the supplied voltage. This movement of charge between the electrodes causes a current in the secondary circuit, which can be measured to give an indication of the pressure of the gas or gas composition in the chamber.

If the bore length d is increased, the breakdown voltage will increase, but the ionisation threshold voltage at which a corona starts, should remain substantially the same. The energy stored in the electrode capacitor at the ionisation voltage will thus stay the same, but the energy necessary to create a spark and the energy necessary to ignite the gas will increase.

By increasing d, it is therefore possible to make a spark-plug such that the energy stored in the electrode capacitor at the ionisation voltage is less than the energy required to create a spark and also less than the energy required to ignite the gas. Note that in a conventional spark-plug, the voltage at which a corona is formed in normally very close to breakdown voltage to create a spark. Because in a conventional spark-plug more than 5 mJ of energy is stored in the electrode capacitor at these voltages, a spark will form and the energy will be dissipated in the plasma, possibly igniting the gas.

Hence, the spark-plug may be configured such that energy stored in the electrode capacitor at a corona discharge threshold at any of the electrodes is substantially less than the energy required to create a spark over the spark-gap; and the method may comprise the step of driving the electrodes with a voltage signal to generate said corona, or to generate said corona before forming a spark over the spark-gap.

The voltage signal may be a fast rise-time voltage signal, which is one of an edge of a single voltage pulse and an edge of a continuous wave. The rise time of the fast rise-time voltage may be high enough to generate a positive or negative corona at one or both of the electrodes. The rise-time may be faster than 100 kV/μs.

In another form of the method an amplitude of the voltage signal may be one of smaller than, equal to and larger than a positive or negative corona threshold voltage of the substance in a region of the spark-gap. The amplitude of the voltage signal may be one of smaller than, equal to and larger than a breakdown voltage for the spark-gap.

The method may comprise the step of varying an output power level of a drive circuit for the electrodes between a first lower level suitable to create a corona discharge for the measurements, to a second higher level to form a spark and to transfer energy for ignition. The second power level may be dependent on results of the measurements. Hence a time period between creation of the corona and the formation of the spark may be indefinite in that a spark is never created, or may be selectable.

This measured data may be used to determine one or more of chamber pressure, position of the piston, pre-combustion parameters, combustion parameters and post combustion parameters in the chamber, to open possibilities such as improved timing, improved energy transfer control, system information for possible engine control purposes and automatic timing.

One method of automatic timing is to use multiple low energy corona discharges and measure the rate of change of energy transferred back to the primary side. When the gas is close to maximum compression, the rate of change will become small. When the rate of change is smaller than a threshold, the gas is ignited.

These control systems and methods may be implemented by using the above drive circuits, the low loss high frequency transformer and a suitable spark-plug. The power level of the drive circuit may be adjustable or variable between a first lower power level at which corona discharge is created for measurements as hereinbefore described and a second higher level at which the gas is ignited. The power control and measurement may be done by a control circuit located inside the housing 28. The controller may be integrated with the drive circuit. This eliminates the need for an external trigger 40 connected to the housing. It may also eliminate other mechanisms that are currently used to sense the piston position for determining the spark time. The controller may comprise a microprocessor and associated memory arrangement wherein data relating to optimum spark time/duration and/or energy and/or power levels for different combustion chamber conditions may be stored. The controller may be connected to or may form part of a central energy management system.

More sophisticated control systems may be used to calculate the spark time/duration and energy based on the combustion chamber measurements. The optimum spark time duration and energy for different combustion chambers conditions may be measured beforehand for a certain engine and programmed into the controller.

The invention claimed is:

1. A method of monitoring at least one parameter associated with a gaseous substance in a chamber, the method comprising the steps of:

utilizing a first electrode and a second electrode, at least one of which is exposed to the substance and which collectively define a gap and form an electrode capacitor, to generate a corona at the at least one electrode without creating a spark over the gap;

causing the corona to change an electrical parameter in a region of the at least one electrode which is indicative of the at least one gas parameter;

causing a signal relating to the electrical parameter to be sensed by electronic circuitry connected to the electrodes; and measuring the signal sensed by the circuitry, to monitor the at least one gas parameter.

2. A method as claimed in claim 1, wherein the electrodes form part of a spark-plug configured such that energy stored in the electrode capacitor at a corona discharge threshold at any of the electrodes is substantially less than the energy required to create a spark over the gap; and comprising the step of driving the electrodes with a signal to generate said corona, or, to generate said corona before forming a spark over the gap.

3. A method as claimed in claim 2, wherein the signal is a fast rise-time voltage signal, which is one of an edge of a single voltage pulse and an edge of a continuous wave.

4. A method as claimed in claim 3, wherein the rise time of the fast rise-time voltage is high enough to generate a positive or negative corona at one or both of the electrodes.

5. A method as claimed in claim 4, wherein the rise-time is faster than 100 kV/μs.

6. A method as claimed in claim 2, wherein an amplitude of the signal is one of smaller than, equal to and larger than a positive or negative corona threshold voltage of the substance in a region of the spark-gap.

7. A method as claimed in claim 6, wherein the amplitude of the voltage signal is one of smaller than, equal to and larger than a breakdown voltage for the spark-gap.

8. A method as claimed in claim 1, wherein the signal is fed back to a primary side of a transformer, a secondary winding of which is connected to at least one of the electrodes and wherein the measurement is done on the primary side.

9. A method as claimed in claim 1, wherein the gas parameter is monitored before and/or during and/or after ignition of the substance.

10. A method as claimed in claim 1, wherein the gas parameter is used to determine at least one of the timing of and energy in a spark over the gap.

11. A method as claimed in claim 1, wherein the gas parameter is any one or more of pressure in the chamber, composition of the substance and position of a piston moving in the chamber.

12. A method as claimed in claim 2, comprising the step of varying an output power level of a drive circuit for the electrodes between a first lower level suitable to generate said corona for the measurements, and a second higher level to form the spark and to transfer energy for ignition.

13. A method as claimed in claim 12, wherein the second power level is dependent on results of the measurements.

* * * * *